(12) United States Patent
Ouannou et al.

(10) Patent No.: US 11,543,255 B2
(45) Date of Patent: Jan. 3, 2023

(54) METHOD TO PREDICT TRAVEL TIME BY USING ADJACENT TRAVEL TIME

(71) Applicant: salesforce.com, inc., San Francisco, CA (US)

(72) Inventors: Alon Ouannou, Be'er Tuvia (IL); Ravid Hadad, Holon (IL); Gilia Bar, Zur Moshe (IL); Olivier Uzan, Modi'in (IL); Yonatan Zinkower, Tiv'on (IL)

(73) Assignee: salesforce.com, inc., San Francisco, CA (US)

( * ) Notice: Subject to any disclaimer, the term of this patent is extended or adjusted under 35 U.S.C. 154(b) by 327 days.

(21) Appl. No.: 16/994,602

(22) Filed: Aug. 16, 2020

(65) Prior Publication Data
US 2022/0049968 A1 Feb. 17, 2022

(51) Int. Cl.
*G01C 21/34* (2006.01)
*G01C 21/32* (2006.01)
*G01C 21/36* (2006.01)
*G06K 9/62* (2022.01)

(52) U.S. Cl.
CPC ......... *G01C 21/3492* (2013.01); *G01C 21/32* (2013.01); *G01C 21/3614* (2013.01); *G06K 9/6219* (2013.01)

(58) Field of Classification Search
CPC ............... G01C 21/3492; G01C 21/32; G01C 21/3614; G06K 9/6219
USPC ........................................................ 707/736
See application file for complete search history.

(56) References Cited

U.S. PATENT DOCUMENTS

2004/0093290 A1* 5/2004 Doss .................. G06Q 10/1095
705/35

* cited by examiner

*Primary Examiner* — Jeffery A Williams

(57) ABSTRACT

Disclosed embodiments are a computing system and a computer-implemented method related to predicting travel time by using adjacent travel time. The prediction may be based on correcting the nominal predictive travel time estimation using a relation between the predictive travel time estimation and the nominal predictive travel time estimation of a nearby commuting instance in a similar direction. This allows a reduced number of queries to the geographic information system, which may save time, costs and conserve communication resources.

19 Claims, 6 Drawing Sheets

METHOD TO PREDICT TRAVEL TIME BY USING ADJACENT TRAVEL TIME

BACKGROUND

Some embodiments relate to route planning and, more specifically, but not exclusively, to efficient estimation of actual travel time between given locations.

Predictive Travel Time (PTT) is valuable for tasks that necessitate commuting between multiple geographical locations, such as delivery of goods, house calls, trip planning, daily commuting, taxi service, garbage collection, house maintenance and repairs such as electricity and plumbing, and/or the like. Real time, optimized scheduling, may improve the efficiency, save time, reduce consumption of resources required for commuting such as fuel and vehicle maintenance, and reduce burnout. Performing the optimization, may require considering a huge amount of options for routes between the geographical locations, orders of visiting these locations, allocation of these locations to commuting agents, and/or the like. The travel time estimation for each route between each pair of geographical locations may depend on the time and day, due to considerations such as traffic.

An ordered list of geographic locations may be referred to as a tuple. Examples of such tuples comprise a pair of source and destination location, and a list of stops along a bus route. A query of time estimation for a commuting instance, given the vehicle type, a tuple of locations, and time, may be referred to as a PTT query. Handling a PTT query may comprise searching the server cache for a PTT record. Having the query answer in the cache, saves time and other computing resources, however caches are limited in size.

When the query is not found in cache, the handling may check a cloud database, and if the query is also not found there, it may query a geographic information system (GIS), which may be a third party service, which is slower and potentially more expensive to access frequently. The GIS may provide a nominal PTT, which may be based on the distance along routes and the route types, however does not consider the variations along the time and the day, due to considerations such as traffic.

Inferring the actual PTT from the nominal PTT may comprise applying a corrective factor on the nominal PTT, which may be an additive factor, a multiplicative ratio, or the like, representing the time and day variance of delays such as traffic. When a ratio for the source and destination locations, given time and day, is not found by searching the server cache for a ratio estimation compliant with the query, the inferring may further comprise submitting another query to a cloud database, and if the query answer is also not found there, it may query the GIS, which may be a third party service, again, incurring the costs in speed, bandwidth and through service agreement.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DETAILED DESCRIPTION

Figure 1:
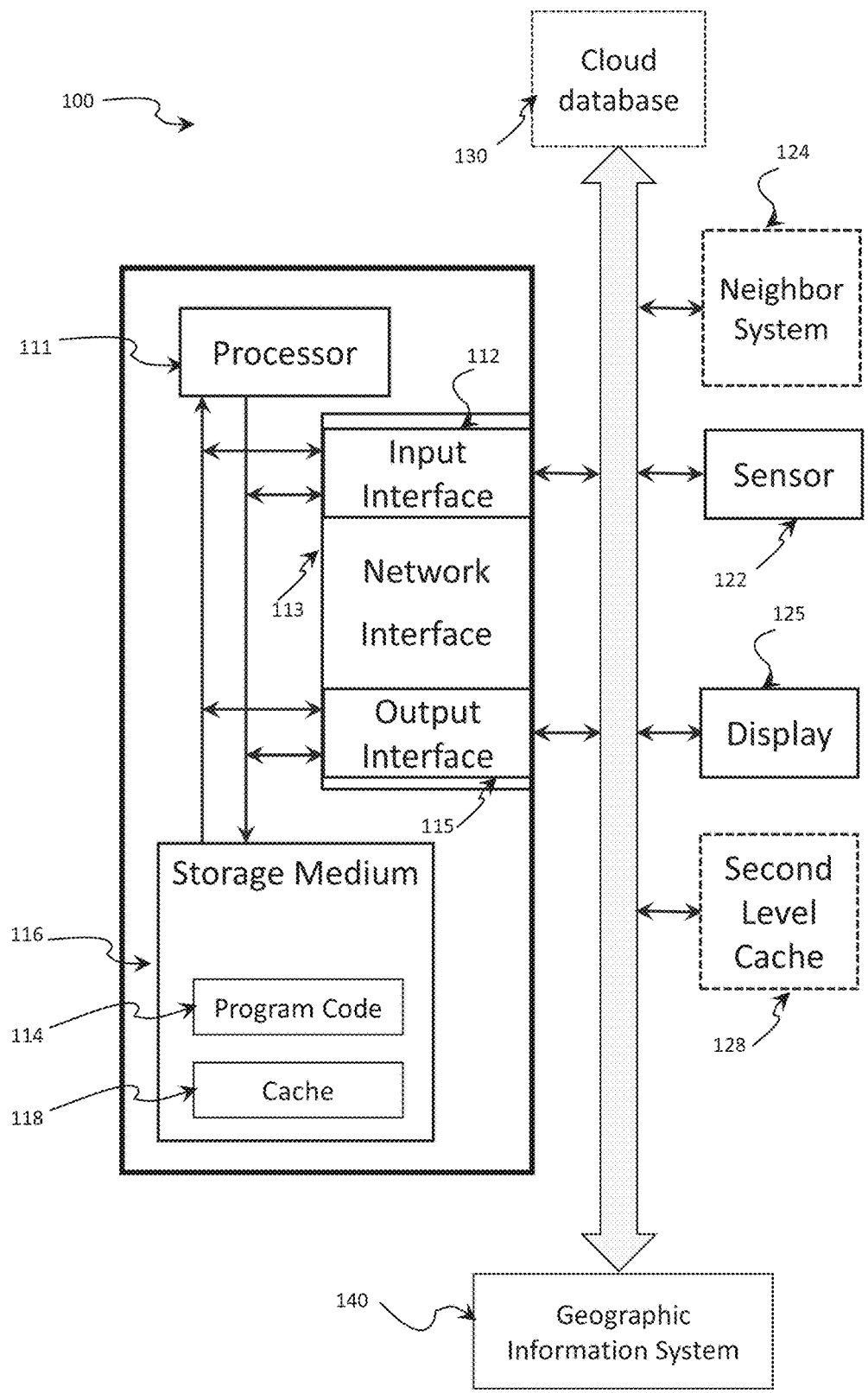
FIG. 1 is a schematic illustration of an exemplary system for predicting travel time by using adjacent travel time, according to some embodiments of the present disclosure.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Some embodiments relate to route planning and, more specifically, but not exclusively, to efficient estimation of actual travel time between given locations.

Querying a GIS server may consume a lot of time, and thus account for a bottleneck compared to processor time. Systems submitting many PTT queries may be encumbered by accumulated delays due to the communication overhead of the PTT queries, and provide sub-optimal routes, allocations, and/or the like.

Shortcomings of known practices include dependence on frequent access to large, remote, databases or third party servers, incurring delays, potential bottlenecks, costs, and exposure to industrial intelligence issues.

The disclosure may involve generating an estimation of the requested information, in a timely manner, using reduced traffic to remote and/or third party servers. The estimation may be based on a PTT provided by the GIS server, as well as the nominal PTT, which may also be referred to as Non-Predictive Travel Times, or Street Level Routing (SLR) Travel Time. It may be assumed that the delay patterns incurred due to traffic and the like, within a certain area, or in a given direction between certain areas, and in a given time window are adequately similar between different commuting instances. It may also be assumed that when traffic incurs significant delays, many commuting instances are in similar directions, for example, Monday morning traffic may be characterized by many commute instances from suburbs to industrial areas, and Monday afternoon traffic may be characterized by many commute instances from urban centers towards the suburbs. This may suggest that relations between the PTT and the nominal PTT, provided by the GIS server, may be reused when a similar query is made. Therefore, given the commuting instances start and finish in the same areas, (e.g. both start at neighborhood A and finish at neighborhood B) and occur on the same time window, the ratio between the nominal PTT and the actual PTT may also be similar. For example, if ratio between the actual PTT and the nominal PTT for points A and B at time T is K, then same ratio can be used for points C and D at time T, when A and C are adjacent and B and D are adjacent. The adjacency required may be determined according to the distance between A and B, meaning that the same ratio may be used for coarser grids when the commute distance is longer and for finer grids when the distance is shorter. The grid resolution may be determined according to Dist(A,B), and given the actual PTT and the nominal PTT for (A→B, T), the ratio may be determined for the tuple Grid(A), Grid(B) and Time(T). When query for (C→D, T) arrives, and a record is available for the tuple Grid(C), Grid(D) which is the same tuple of grid squares, and same Time(T). The ratio may be used to determine the actual PTT given the nominal PTT, by multiplying the nominal PTT by the ratio.

Some alternative embodiments of the present disclosure may rely on a municipal partition, such as cities, quarters, neighborhood, streets, and/or the like, to assign geographic locations to clusters representing proximity. Additional alternative embodiments may use grids other than square such as triangular, hexagonal, uneven spatial divisions, and/or the like. Further alternative embodiments may search the cache for corrective factors of one or more proximal commuting instances in compatible timing, when a query for a commuting instance is received. Optionally, interpolation between two or more proximal commuting instances may be applied.

Some further alternative embodiments may assume the traffic delays incurred on a commuting instance between different locations in a the same neighborhood to different location in another town may be substantially constant, and apply an additive factor, rather than a multiplicative ratio to obtain the actual PTT from the nominal PTT, use a non-linearly increasing function of the distance, or a combination of similar functions.

According to a first aspect of some embodiments of the present invention there is provided a system for calculating predictive travel time estimations given a tuple of geographic locations and a time, the system comprising:

at least one memory storing a code, a set comprising geographic locations, each location is assigned to a cluster, a cache storing corrective factors for tuples of clusters; and a processor adapted to execute the code for:

receiving the tuple of a plurality of geographic locations and the time, the geographic locations comprised by the set;

using the network interface for querying a geographic information system for a nominal predictive travel time estimation, by submitting the tuple of a plurality of geographic locations;

using the network interface for receiving a nominal predictive travel time estimation, from the geographic information system;

querying the cache for a corrective factor for at least one cluster tuple, wherein the tuple of the plurality of geographic locations is associated with said cluster tuple; and calculating a predictive travel time estimation by applying the corrective factor for the at least one cluster tuple on the nominal predictive travel time estimation.

According to a second aspect of some embodiments of the present invention there is provided a computer implemented method for calculating predictive travel time estimations given a tuple of geographic locations and a time, using a set comprising geographic locations each location is assigned to a cluster, and cache storing corrective factors for tuples of clusters, the computer implemented method comprising:

receiving the tuple of a plurality of geographic locations and the time, the geographic locations comprised by the set;

using the network interface for querying a geographic information system for a nominal predictive travel time estimation, by submitting the tuple of a plurality of geographic locations;

using the network interface for receiving a nominal predictive travel time estimation, from the geographic information system;

querying the cache for a corrective factor for at least one cluster tuple, wherein the tuple of the plurality of geographic locations is associated with said cluster tuple; and calculating a predictive travel time estimation by applying the corrective factor from the at least one cluster tuple on the nominal predictive travel time estimation.

According to a third aspect of some embodiments of the present invention there is provided a computer program product for calculating predictive travel time estimations given a tuple of geographic locations and a time, using a set comprising geographic locations, each location is assigned to a cluster, and cache storing corrective factors for tuples of clusters, the computer program product comprising a non-transitory computer readable storage medium having:

first program instructions for receiving the tuple of a plurality of geographic locations and the time, the geographic locations comprised by the set;

second program instructions for using the network interface for querying a geographic information system for a nominal predictive travel time estimation, by submitting the tuple of a plurality of geographic locations;

third program instructions for using the network interface for receiving a nominal predictive travel time estimation, from the geographic information system;

fourth program instructions for querying the cache for a corrective factor for at least one cluster tuple, wherein the tuple of the plurality of geographic locations is associated with said cluster tuple; and fifth program instructions for calculating a predictive travel time estimation by applying the corrective factor from the at least one cluster tuple on the nominal predictive travel time estimation.

Optionally, the cache storing corrective factors for tuples of clusters further storing times, and querying the cache for a corrective factor for at least one cluster tuple further comprising checking when time is compliant.

Optionally, each location is assigned to a cluster, determined by a grid division.

Optionally, an additional assignment of geographic locations to clusters is determined by a finer grid division.

Optionally, each location is assigned to a cluster, determined by a municipal partition.

Optionally, applying the corrective factor from the at least one cluster tuple on the nominal predictive travel time estimation, is done by multiplication.

Optionally, comprising an additional assignment of geographic locations to clusters, and the assignment of associative clusters is determined by comparing the distance between the geographic locations in the tuple to a threshold.

Optionally, the additional assignment of geographic locations to clusters is hierarchical, and at least one cluster of one assignment comprises a plurality of clusters of the other assignment.

Optionally, when a corrective factor for at least one cluster tuple is not found in the cache:

using the network interface for querying the geographic information system for a predictive travel time estimation, by submitting the tuple of a plurality of geographic locations and the time;

using the network interface for receiving a predictive travel time estimation, from the geographic information system;

calculating the corrective factor based by applying the predictive travel time estimation on the nominal predictive travel time estimation; and storing the corrective factor as a corrective factor for the tuple of the associated clusters.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, scripting languages such as Python, Perl or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic illustration of an exemplary system for predicting travel time by using adjacent travel time, according to some embodiments of the present disclosure.

Figure 2:
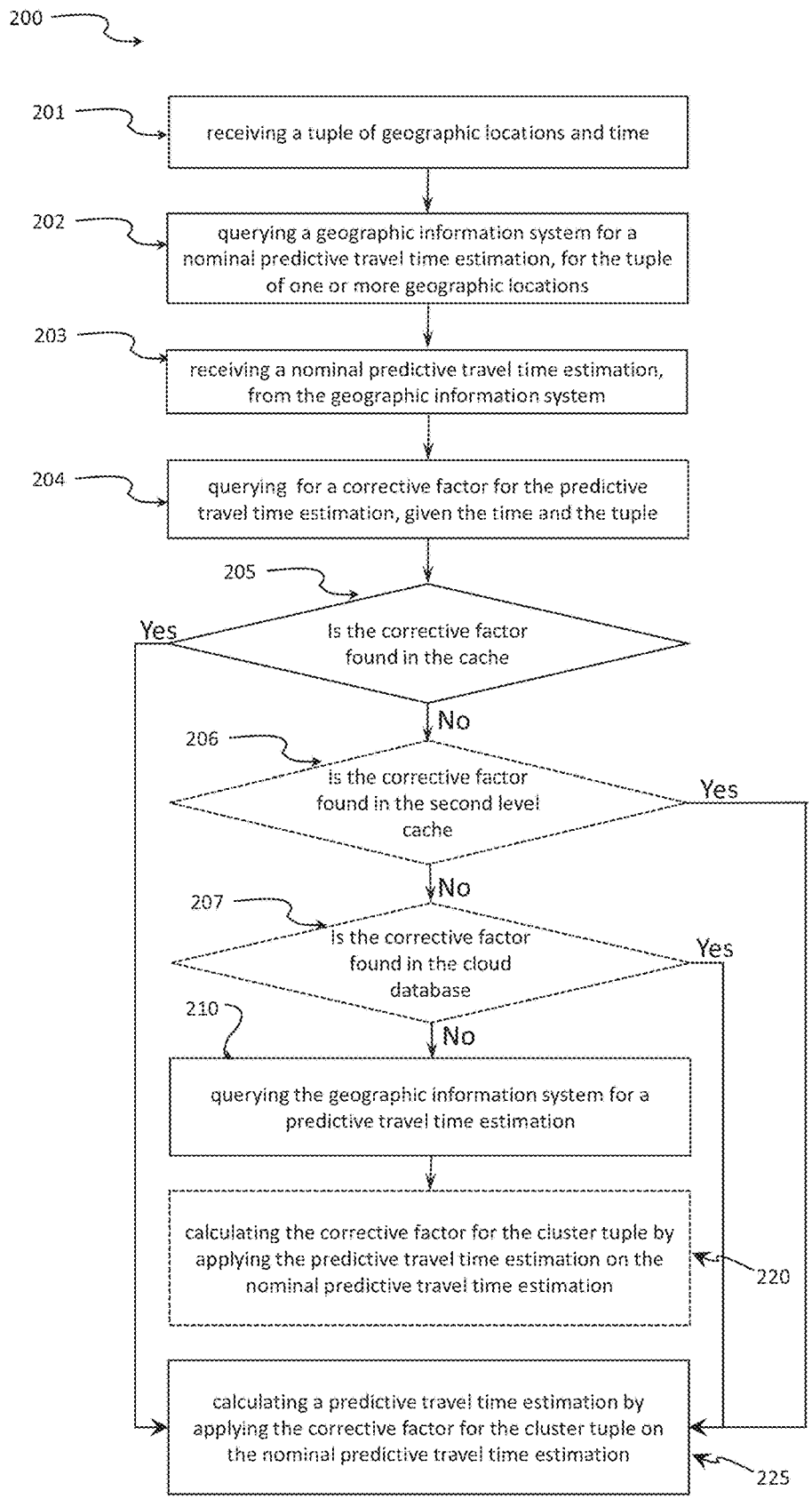
FIG. 2 is a flow chart of an exemplary process for predicting travel time by using adjacent travel time, according to some embodiments of the present disclosure.

The exemplary system for calculating predictive travel time estimations given a tuple of geographic locations, considering time varying factors, or predicting travel time 100 may execute processes, such as processes 200, which is described in FIG. 2, and may be applied for predicting travel time using variety of vehicles such as motorcycles, private cars, pickup trucks, trailer trucks, and/or the like, and/or transportation methods using services such as carpools, taxi services, bus services, trains, and/or the like.

The system for predicting travel time 100 may include a network interface 113, which comprises an input interface 112, and an output interface 115. The system further comprises a processor 111, and a storage medium 116 for storing a program code 114, a cache 118 for storing data such as corrective factors associated with tuples of clusters, or cluster level corrective factors, and/or additional data. The processor 111 may execute code from the program code 114 for implementing process 200, which is described in FIG. 2. System for predicting travel time 100 may be implemented on one or more computers, compute server, and or the likes, physically located on a site, and/or implemented, as a distributed system, virtually on a cloud service, on machines also used for other functions, and/or by several other options.

Alternatively, the system 100 may be implemented on a mobile device, a programmable cellular phone, a tablet, and/or the likes.

Further alternatively, the system may comprise dedicated hardware, ASIC, FPGA, and/or the likes. It should be noted that application-specific hardware may account for better speed and lower power consumption, however, at a potential cost of additional resources required during design and limit flexibility in system updates.

The input interface 112 and the output interface 115 may comprise one or more wired and/or wireless network interfaces for connecting to one or more networks, for example, a local area network (LAN), a wide area network (WAN), a metropolitan area network, a cellular network, the internet and/or the like. The input interface 112 and the output interface 115 may further include one or more wired and/or wireless interconnection interfaces, for example, a universal serial bus (USB) interface, a wireless local area network (WLAN), and/or the like. Furthermore, the output interface 115 may include one or more wireless interfaces for loudspeakers, display, updating of external systems such as recommender systems, and/or the like, as well as other processors executing post-processing. The input interface 112 may include one or more wireless interfaces for receiving information from one or more devices. Additionally, the input interface 112 may include specific means for communication with one or more sensor devices 122 such as a camera, microphone, keyboard, touchscreen, mouse, scanner and/or the like. The sensor devices 122 may also be used to update configuration, preferences, and/or the like. The input interface may be configured to access a neighbor system 124, in order to receive queries for PTTs, indicators about the environment conditions such as weather or traffic, and the like. The neighbor system 124 may initiate queries, or be accessed for in accordance with various application requirements. The output interface 115 may include specific means for communication with one or more display devices 125 such as a loudspeaker, screen, projector and/or the like. Furthermore, the display device may comprise a model, device, and/or the likes, which executes further processing on indications from the system. The output may be further used to indicate PTT, accumulated overhead due to delays such as traffic, on other systems, the cloud, displayed on a web page through the internet, and/or the likes.

The processor 111 may be homogenous or heterogeneous and may include one or more processing nodes arranged for parallel processing, as clusters and/or as one or more multi-core processors. The storage medium 116 may include one or more non-transitory persistent storage devices, for example, a hard drive, a Flash array, a removable media, and/or the like. The storage medium 116 may also include one or more volatile devices, for example, a random access memory (RAM) component and/or the like. The storage medium 116 may further include one or more network storage resources, for example, a storage server, a network attached storage (NAS), a network drive, and/or the like, accessible via one or more networks through the input interface 112 and the output interface 115. Both the program code 114, and cache 118 may be stored completely or partially on a processor cache for speed, however since the storage size limits may be tighter there, and operating systems may impose limitations on processor cache allocation, the cache may be stored in physical or virtual memory, which may comprise memory modules, solid state drives (SSD), hard drives and/or other computing devices. Furthermore, faster access storage hardware such as dedicated registers, latches, caches, context addressable memory, and/or the likes may be used to enhance processing speed. Data that has to be accessed frequently such as parameters of cluster partitions, the set comprising geographic locations, the assignment of geographic locations to clusters, may be stored using faster access devices, such as caches or video random access memory (VRAM), while data that is accessed rarely such as corrective factors for tuples comprising sparsely populated regions, road layouts of rural outskirts and/or the likes may be stored using slower, yet more flexible and inexpensive means such as a network attached storage, a cloud service, and/or the like.

Optionally, a second level cache 128 may be provided for storage of corrective factors, PTT estimation, related geographic information, traffic patterns, whether predictions, and/or the likes.

Optionally, the system has interfaces with one or more cloud databases 130, residing on virtual servers, which may be proximally or remotely located, in house, or provided by a third party. Such databases allow flexibility in sizes and may reduce the required number of queries to the GIS, which may be slower and more expensive.

Optionally, frequent and/or GIS query answers may be cached in the cache 118, the second level cache 128, or the cloud database 130, to reduce the frequency of the more expansive and time consuming queries to the GIS service.

The system may have interfaces with one or more GIS services 140, which may also be maintained proximally or remotely, in house, or provided by a third party. The GIS may provide nominal PTT estimations, corrected PTT estimations, which may estimate delays due to traffic, weather, infrastructure problems, and/or the like. Other information such as conditions and properties of specific routes and read segments, general warnings, and/or the like may be further used and cached.

Reference is now made to FIG. 2, which is a flow chart of an exemplary process for predicting travel time by using adjacent travel time, according to some embodiments of the present disclosure. The processor 111 may execute the exemplary process 200 for a variety of purposes involving network flow optimization, for computer networks, data communication systems, pipe networks, rail systems and/or the like. Alternatively, the process 200 or parts thereof may be executed using a remote system, an auxiliary system, and/or the like. It should also be noted that other processes for predicting travel time by using adjacent travel time, for example by handling several queries in parallel or pipelining be used.

The exemplary process 200 starts, as shown in 201, with receiving a tuple of geographic locations and time.

As used herein the term tuple refers to a set of two or more locations, i.e. a source location, a destination location, and optionally other locations to visit, to refer to by other means, or serve as metadata. The locations may be specified by names. Coordinates, identifiers within a set, by a property, a sound, or an image associated with them, and/or the like.

One or more time options may be associated with the tuple, giving rise to a PTT estimation query. Optionally, vehicle type or other relevant travel options such as carpooling or public transportation, other constraints or information, and/or flags associated therewith may be further added to the query, to help provide the most relevant answer to the user or the agent for which the query is submitted.

The query may be received through the input interface 112, and arrive from the sensor 122, the neighbor system 124, or the cloud database 130, as shown in FIG. 1. The query may be made for an end user, or for scheduling a service such as an electrician, a package delivery, and/or the like. When scheduling activities such as goods deliveries to grocery shops services or physician house calls, more than one timing options may be queried to reduce the time spent in traffic.

The exemplary process 200 continues, as shown in 202, with querying the geographic information system (GIS) for a nominal predictive travel time estimation, for the tuple of a plurality of geographic locations. The querying comprises submitting the tuple of a plurality of geographic locations, one or more timing options, and optionally other parameters such as vehicle type or preferred public transportation methods to the GIS service. The query may be submitted through the output interface 115, and to the GIS system 140, as shown in FIG. 1. Some implementations may convert the location format. For example by using speech recognition to convert a sound to text, or coordinates to street addresses.

The exemplary process 200 continues, as shown in 203, with receiving the nominal predictive travel time estimation, from the geographic information system. The query may be received through the input interface 112, shown in FIG. 1. The nominal travel time estimation may be based on road structure, bus availability and schedules, and/or the likes, while assuming the vehicle is able to travel at the maximum allowed speed most of the time. The nominal travel time estimation may consider expected overhead such as traffic lights or ticket checkpoints, however assume that neither is encumbered by an accumulated queue. Therefore, there may be substantial differences between the nominal predictive travel time estimation and the realistic predictive travel time estimation.

The exemplary process 200 continues, as shown in 204, with querying for the corrective factor for the predictive travel time estimation, given the time and the tuple.

The actual ratio between the nominal PTT and the actual travel time may vary, however it may be reasonable to assume the ratio predicted by the corrective factor varies smoothly and moderately between proximal commute instances and as the timing changes. Therefore, nearby location may be assigned to a cluster, and there may be a hierarchy of clusters having different resolutions. Optionally, the resolution of the cluster partition is determined by a function of the commute instance length, as considerations such as traffic are assumed to elongate a commuting instance, similarly to commute instances substantially in the same direction, in vicinity and similar times. A function of the distance may determine which division or cluster partition such as different rectangle sizes or neighborhoods versus cities is relevant.

When there is a single cluster partition, the relevant cluster partition is given. The source, destination, and optionally other points may be assigned to the associative clusters according to the relevant partition, and the associative clusters determine a tuple of clusters.

Alternatively, neighboring points may be chosen according to a distance measure, and interpolation methods, weighted or unweighted, or based on a given number K of nearest neighbors (KNN) may be used in addition to, or instead of the clustering. Querying the cache for the corrective factor for cluster tuple (e.g. looking up the cache), wherein each geographic location from the cluster is assigned to its associative cluster comprises a search, which may be determined by the cache data structure. The search may be direct, hashed, based on matrices, trees, and/or the likes.

Delays such as traffic may vary with time, therefore a time range, or a measure of time proximity used for searching and/or interpolation may be applied. The time similarity may be based on straightforward, linear difference, or may consider some periodicity such as time and day in the week.

Considerations such as vehicle type may be handled by a factor, for example, considering the slower acceleration of trucks may be done through maintaining a different corrective factor, by applying a general correction for the vehicle type, interpolation, estimation, or the likes.

When there is a single cache, which may be inside the storage medium 118 shown in FIG. 1, the query is submitted thereto. Alternatively, the single level cache may be the second level cache 128, on the neighbor system 124, or the cloud database 130 (shown in FIG. 1), which may still be substantially faster and cheaper to access than the GIS service.

The exemplary process 200 may continue, as shown in 205, with checking if the corrective factor found in the cache 118, shown in FIG. 1.

The system may store a set comprising geographic locations, each location is assigned to a cluster, and corrective factors for tuples of clusters. The cache storing corrective factors for tuples of clusters may be further partitions to time bins, time stamps, and/or the like, and querying the cache for a corrective factor for the cluster tuple may further comprise checking when the time is compliant with a time stamp associated with a corrective factor. Optionally, interpolation such as linear or quadratic interpolation may be applied when time is not compliant. Alternatively, periodic functions may be used to predict the effect of time change on the corrective factor.

Optionally, interpolated values may be used when a corrective factor is not found in the cluster tuple, however tuples comprising one neighbor of the associated clusters are found.

When the corrective factor is found, the process may continue to predict the PTT.

When the corrective factor is not found in the cache 118, shown in FIG. 1, the processor or system executing the process 200 may continue, as shown in 206, with checking if the corrective factor found in the second level cache.

The system may store a larger set of corrective factors in an additional system. Optionally, heuristics and/or interpolation may also be applied for second level cached corrective factors. When the corrective factor is found, the process may continue to predict the PTT.

When the corrective factor is not found in the second level cache, the processor or system executing the process 200 may continue, as shown in 207, with checking if the corrective factor found in the cloud database.

The cloud database may store a larger set of corrective factors, and optionally apply heuristics, interpolations, and/or the like to estimate the corrective factor. When the corrective factor is found, the process may continue to predict the PTT.

When the matching corrective factor for at least one cluster tuple, optionally considering time and transportation mode, is not found in the cache, or in a second level cache, a cache maintained on a cloud database or the like, the processor or system executing the process 200 may continue, as shown in 210, with querying the geographic information system for the predictive travel time estimation, which considers actual delays expected due to traffic weather, and the like. The query may comprise submitting the tuple of a plurality of geographic locations, the time, and other considerations such as vehicle type, permission to use toll bridges, highways, and the like.

Followingly, the system may receive a predictive travel time estimation, from the geographic information system, and submit the result to the query initiator through the output interface 115 in FIG. 1.

The exemplary process 200 may continue, as shown in 220, with calculating the corrective factor for the cluster tuple by applying the predictive travel time estimation on the nominal predictive travel time estimation.

Calculating the corrective factor may be performed by dividing the predictive travel time estimation on the nominal predictive travel time estimation, when the corrective factor is multiplicative.

Alternatively, the corrective factor may be calculated by subtracting the nominal predictive travel time estimation from the predictive travel time estimation, for an additive corrective factor. Other functions may also be applied to express other dependence patterns.

The calculation may be followed by storing the corrective factor as a corrective factor for the tuple of the associated clusters, optionally in more than one hierarchies, and for a given time bin, or together with a time stamp. The storing may be done in either or both the cache 118, the second level cache 128, on a neighbor system 124, or a cloud database 130 (shown in FIG. 1), Storing it on a more accessible cache such as 118 saves more time when processing a query for locations in the same clusters and in a compatible time.

Moreover, when the corrective factor is found, in either cache or a cloud database, the processor or system executing the process 200 continues, as shown in 225, with calculating a predictive travel time estimation by applying the corrective factor for the cluster tuple on the nominal predictive travel time estimation.

Optionally, applying the corrective factor from the at least one cluster tuple on the nominal predictive travel time estimation, is done by multiplication. This correction may be based on an assumption that delays due to traffic, weather, and the like, cause similar delays on all types of roads in the same area and direction.

Alternatively, applying the corrective factor from the cluster tuple on the nominal predictive travel time estimation, is done by addition, following an alternative assumption that traffic, weather, and the like, inflict most of the delays on main roads and traffic within neighborhoods is less subject to delays. Further alternatively, a combination of an additive and a multiplicative correction factors, or other functions representing the expected delay relations to the nominal PTT may be used.

Figure 3A:
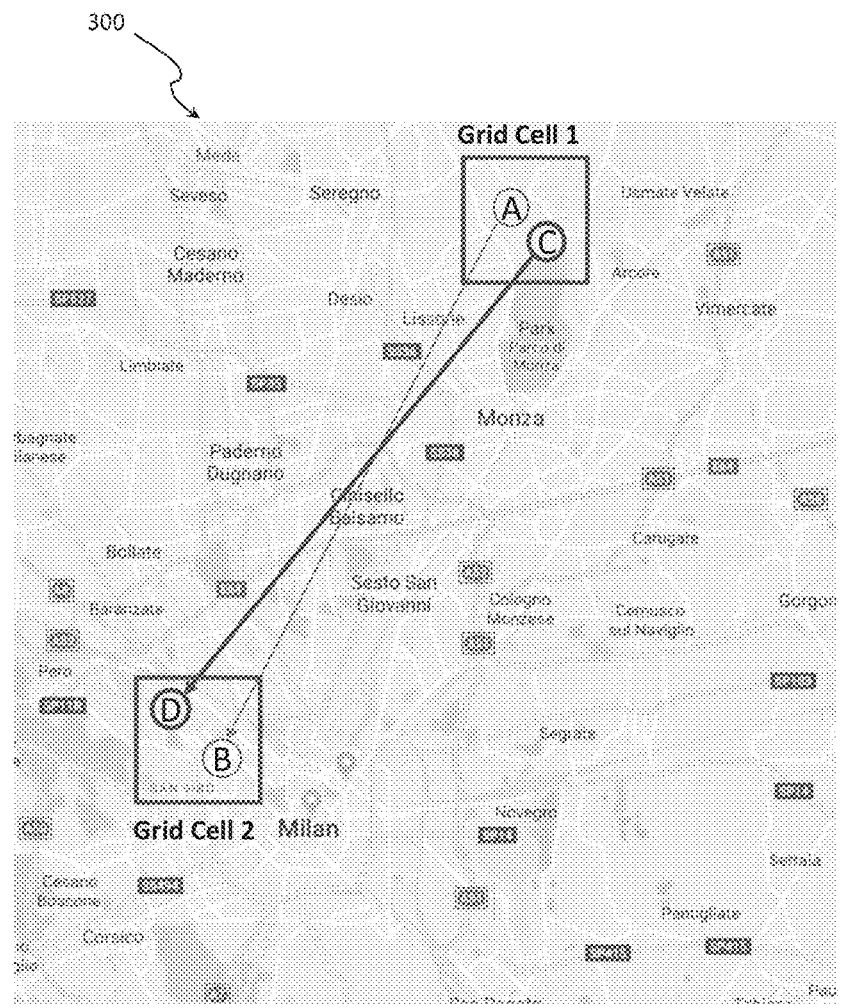
FIG. 3A depicts a map of a metropolitan area, and two exemplary tuples of source and destination points, according to some embodiments of the present disclosure.

Reference is now made to FIG. 3A, which depicts a map of a metropolitan area, and two exemplary tuples of source and destination points, according to some embodiments of the present disclosure.

The map 300 shows the metropolitan area of Milan as an exemplary case. The exemplary case relates to four exemplary points, A in Sovico, B in Portello, C in Gerno, and D in Garegnano. Note that A and C are comparatively close communes north of Monza, and less than 4 kilometers apart. Similarly, B and D are both in a more central area, having more commercial and industrial activities, and are less than 4 kilometers apart. Both commuting instances, A→B and C→D, take place on Monday morning, and are about 20 kilometers in aerial distance. The ratio between the length of the commute instances and the distances between both the sources and destinations thereof, being at least 5, or well over 3 considering latitude and longitude distances of up to 4 kilometers within the grid square, may indicate high likelihood that the routes may include common road segments, such as Highway E64, or additional roads other residents of north-eastern suburbs of Milan would consider as viable alternatives to commute to northwest central quarters.

In this example, each location is assigned to a cluster, determined by a grid division, and a grid of 4 kilometers, wherein A and B are in the same cluster, and another cluster comprises C and D. A distance five times greater indicates the commuting instances are substantially toward the same direction.

The system executing a process for predicting travel time by using adjacent travel time, such as 200 shown in FIG. 2, may query an exemplary GIS service, such as Google Maps™, about the Monday morning commute instance from A to B and receive 29 minutes as the nominal PTT prediction, and 70 minutes as the PTT prediction considering traffic.

The system may calculate the corrective factor 2.41=70/29, and store it for future, similar queries. When a similar query, for example, the Monday morning commute instance from C to D arrives, the system may receive a nominal PTT of 31 minutes. The system may multiply the nominal PTT by the corrective factor, receiving 2.41*31=74.8. An experimental query sent to the exemplary GIS service, was answered with a close answer of 75 minutes.

Figure 3B:
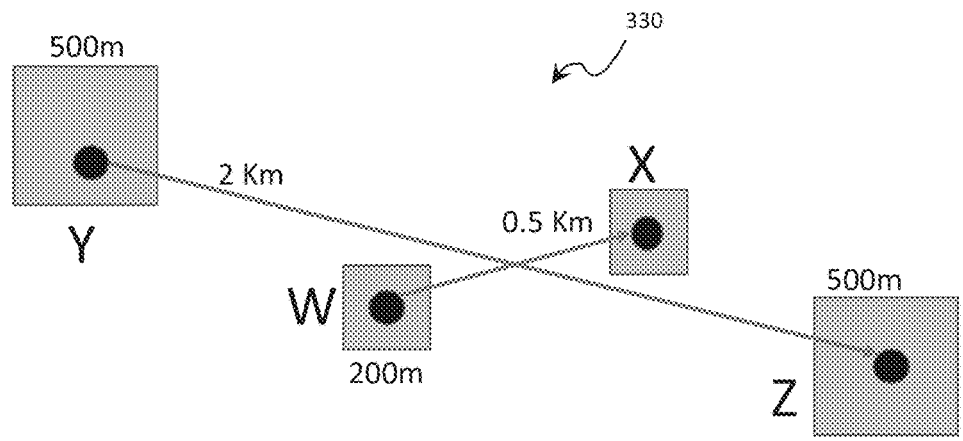
FIG. 3B depict an exemplary, grid based assignment of locations to clusters, having two resolution levels, according to some embodiments of the present disclosure.

Reference is now made to FIG. 3B, which depicts an exemplary, grid based assignment of locations to clusters, having two resolution levels, according to some embodiments of the present disclosure.

The exemplary cluster partition 330 comprises two grid resolutions. This is an example of a system or a method having a first assignment and an additional assignment of geographic locations to clusters, and the assignment of associative clusters is determined by comparing the distance between the geographic locations in the tuple to a threshold. The first assignment of geographic locations to clusters shown is determined by a coarser division of 500 m and the additional assignment is determined by a finer grid division of 200 m. It should be obvious to the person skilled in the art that three or more resolutions may also be used, and that the numbers and ratios may be changed.

When the length of the commute instance is half a kilometer, such as from W to X, the finer resolution of 200 m by 200 m squares may be used for storing associated corrective factors. When the length of the commute distance is longer, for example 2 kilometers such as from Y to Z, the coarser resolution of 500 m by 500 m squares may be used for storing associated corrective factors. The distance threshold used to determine which assignment or partition of cluster should be used, may be 1 km, however other values such as 800 m or 1.5 km may also be used. Choice of desired ratios between the distance and cluster size may be subject to desired precision, speed requirements, storage space, and the likes, and any value may be used, however it is expected that a low ratio such as one between the distance and cluster size may not be able to predict directionality of traffic delays. Similarly, a high ratio such as 10 may cause high storage requirements, as the number of clusters is quadratic, relating to the distance. Furthermore, since the clustering considers at least two locations, i.e. the source and destination, the number of corrective factors to store may be quadratic relating to the number of clusters.

It should be noted that implementations may use other clustering methods. For example, in many places there is a strong correspondence between the road structure and municipal limits. For example, the Hudson River separates Manhattan, N.Y. from Union City, N.J. Therefore, Clustering based on the municipal boundaries may contribute to the precision. Each location may be assigned to one or more clusters, determined by one or more municipal partition such as of blocks, streets, neighborhoods, quarters, cities, states, and the like.

More than one level of hierarchy may be used, for example, Manhattan may comprise clusters such as Chelsea and Upper East Side for finer resolution. Another alternative clustering partition may use a rectangular grid aligned to a river such as the Hudson River. In this example, an additional assignment of geographic locations to clusters may be hierarchical, and some cluster of one assignments may comprise a plurality of clusters of the other assignment, for example, Brooklyn may comprise Bay Ridge, Park Slope, Brownsville, and the like.

Grids other than rectangular such as triangular, hexagonal, and the likes may also be used. Grids with size varying clusters may be applied, for example, when a finer grid is required for Manhattan, a coarser grid for Yonkers, and a yet coarser grid for more remote outskirts such as around Sleepy Hollow.

It should also be noted that more than two different hierarchy levels or grid resolutions may be used. Further alternatives may implement a fine resolution is some areas, for example metropolitan centers, popular tourism destinations, and/or the likes, and a coarse resolution for other areas such as mountain, desert, and/or rural areas.

Alternatively, the system may generate a corrective factor by interpolating parameters either associated with the source location, the destination location, additional locations that may be included in the tuple, or with multiple locations from the tuple.

Figure 4:
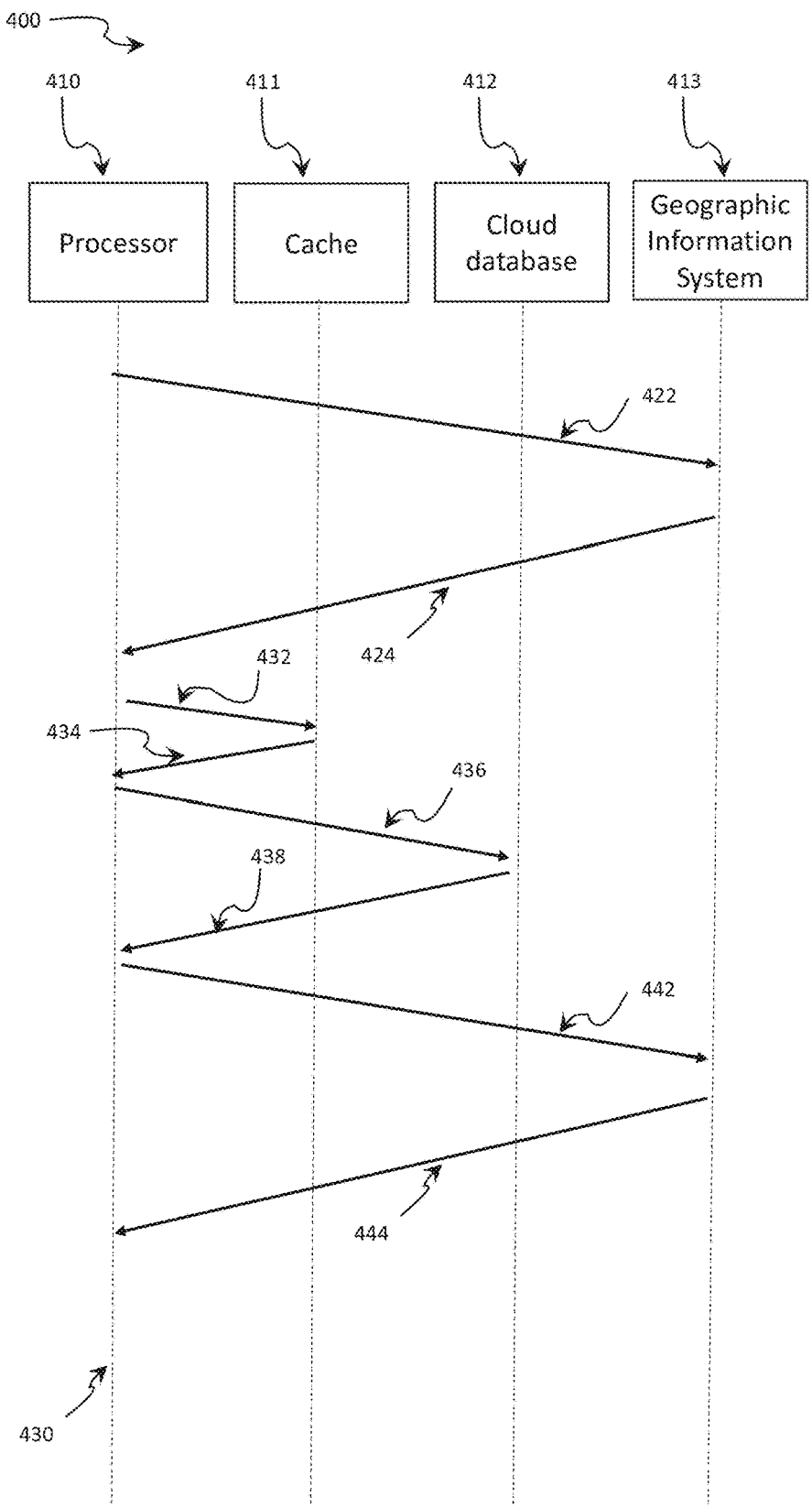
FIG. 4 is a sequence diagram of an exemplary process for predicting travel time by using adjacent travel time, according to some embodiments of the present disclosure.

Reference is now made to FIG. 4, which is a sequence diagram of an exemplary process for predicting travel time by using adjacent travel time, according to some embodiments of the present disclosure.

The exemplary sequence diagram 400 exemplifies a sequence of inferences associated with a process such as 200 (shown in FIG. 2). Some implementations of a process for predicting travel time by using adjacent travel time are initiated by a query, comprising a tuple of geographic locations and time, arriving at the input interface 112 (shown in FIG. 1). The processor 410, is connected to a cache 411, which may be similar to 118 in FIG. 1. The system further comprises a cloud database 412, which may be similar to 130 shown in FIG. 1, and an interface with a geographic information system 413, such as 140 (shown in FIG. 1). The timeline is depicted for each agent such as the processor as a descending line 430.

The exemplary sequence 400 begins as the processor queries the geographic information system (GIS) for a nominal predictive travel time estimation at 422. This query may comprise, for example, a tuple of a source and destination location, as geographic coordinates, street address, and/or the like. The process continues as shown at 424 as the GIS system submits the answer and the processor continues by receiving a nominal predictive travel time estimation. The processor continues at 432 with checking if the corrective factor found in the cache 411. When the cache stores a compliant corrective factor, the processor may apply it on the nominal predictive travel time estimation, however, in this example, the cache indicated at 434 the corrective factor is not found.

In this example, a second level cache is not implemented so the processor continues in 436 with checking if the corrective factor found in the cloud database 412. The query answer received from the cloud database 412, shown in 438, also indicates that the corrective factor is not found.

Followingly, the processor queries the geographic information system (GIS) for a predictive travel time estimation at 442, and receives the predictive travel time estimation at 444. The processor may complete the query, by returning the predictive travel time estimation through the output interface 115.

It should be noted that this is an exemplary flow on an exemplary implementation, provided to illustrate an exemplary sequence of communication transactions, and actual flow of events and system behavior may vary.

Figure 5:
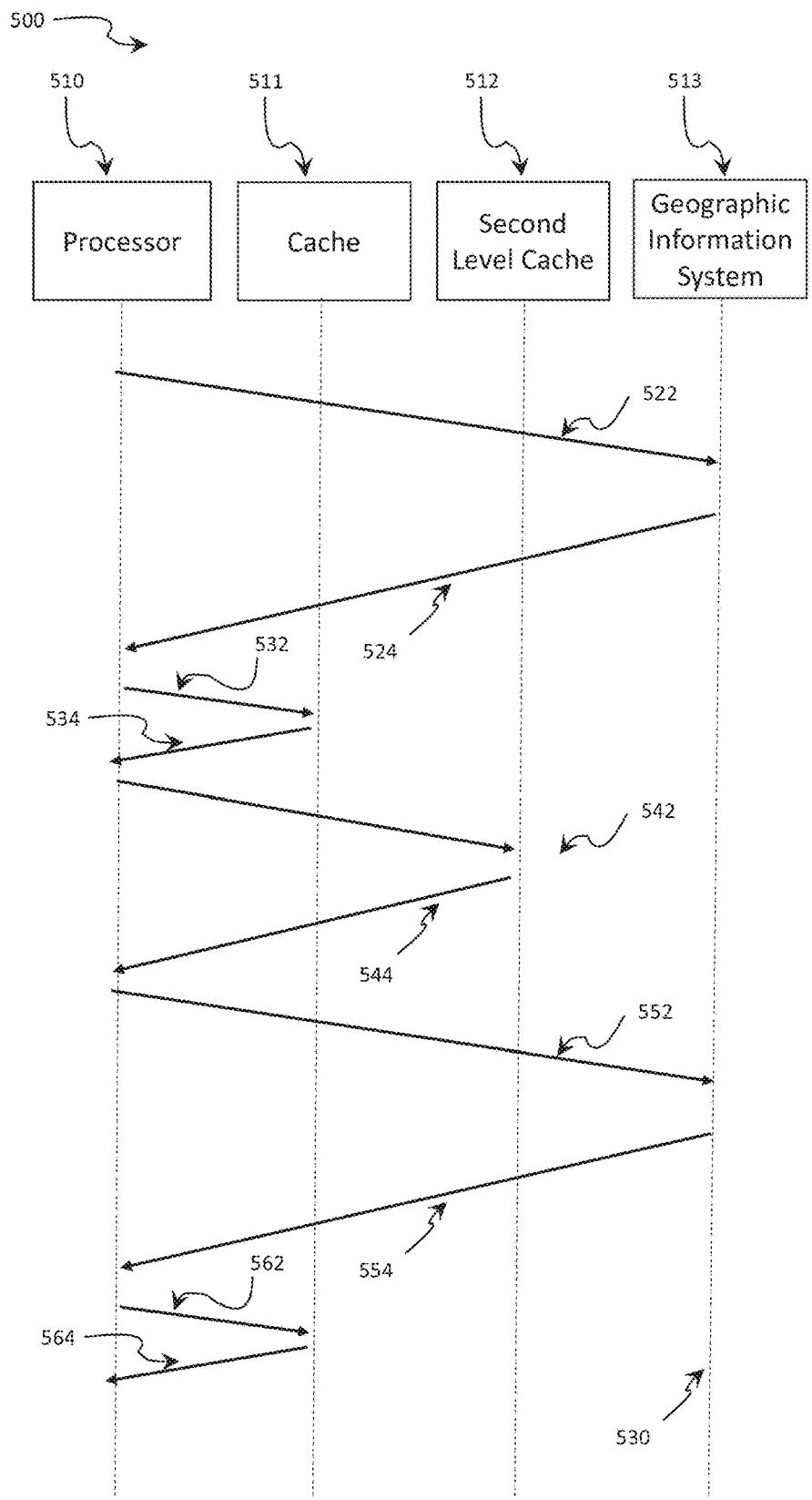
FIG. 5 is an additional sequence diagram of an exemplary process for predicting travel time by using adjacent travel time, according to some embodiments of the present disclosure.

Reference is now made to FIG. 5, which is an additional sequence diagram of an exemplary process for predicting travel time by using adjacent travel time, according to some embodiments of the present disclosure.

The exemplary sequence diagram 500 exemplifies a sequence of inferences associated with a process such as 200 (shown in FIG. 2). Some implementations of a process for predicting travel time by using adjacent travel time, may respond to a query, comprising a tuple of geographic locations and time, arriving at the input interface 112 (shown in FIG. 1). The processor 510, is connected to a cache 511, which may be similar to 118 in FIG. 1. The system further comprises a second level cache 512, which may be similar to 128 in FIG. 1, and an interface with a geographic information system 513, such as 140 (shown in FIG. 1). The timeline is depicted for each agent such as the geographic information system as a descending line 530.

The exemplary sequence 500 starts as the processor queries the geographic information system (GIS) for a nominal predictive travel time estimation at 522. The process continues as shown at 524 as the GIS system submits the answer, and the processor continues by receiving a nominal predictive travel time estimation. The processor continues at 532 with checking if the corrective factor found in the cache 511. The cache stores a compliant corrective factor in this example, and thus transmits it to the processor 511 at 534. The processor may apply it on the nominal predictive travel time estimation, by multiplication, addition, or another function. The processor may complete the query, by returning the predictive travel time estimation through the output interface 115.

A second transaction causes the processor to query the geographic information system (GIS) for another nominal predictive travel time estimation at 542, and receive the associated nominal predictive travel time estimation at 544.

The processor may, due to some heuristic, skip checking the cache, and continue by querying the geographic information system (GIS) for a predictive travel time estimation at 554.

The processor may generate a corrective factor by applying the predictive travel time estimation on the nominal predictive travel time estimation, for example by dividing the former by the latter. Followingly, the processor may store the corrective factor in the cache at 562, and receive an acknowledgement at 564.

It should be noted that this is another exemplary flow on an exemplary implementation, provided to illustrate an exemplary sequence of communication transactions, and actual flow of events and system behavior may vary.

Figure 6:
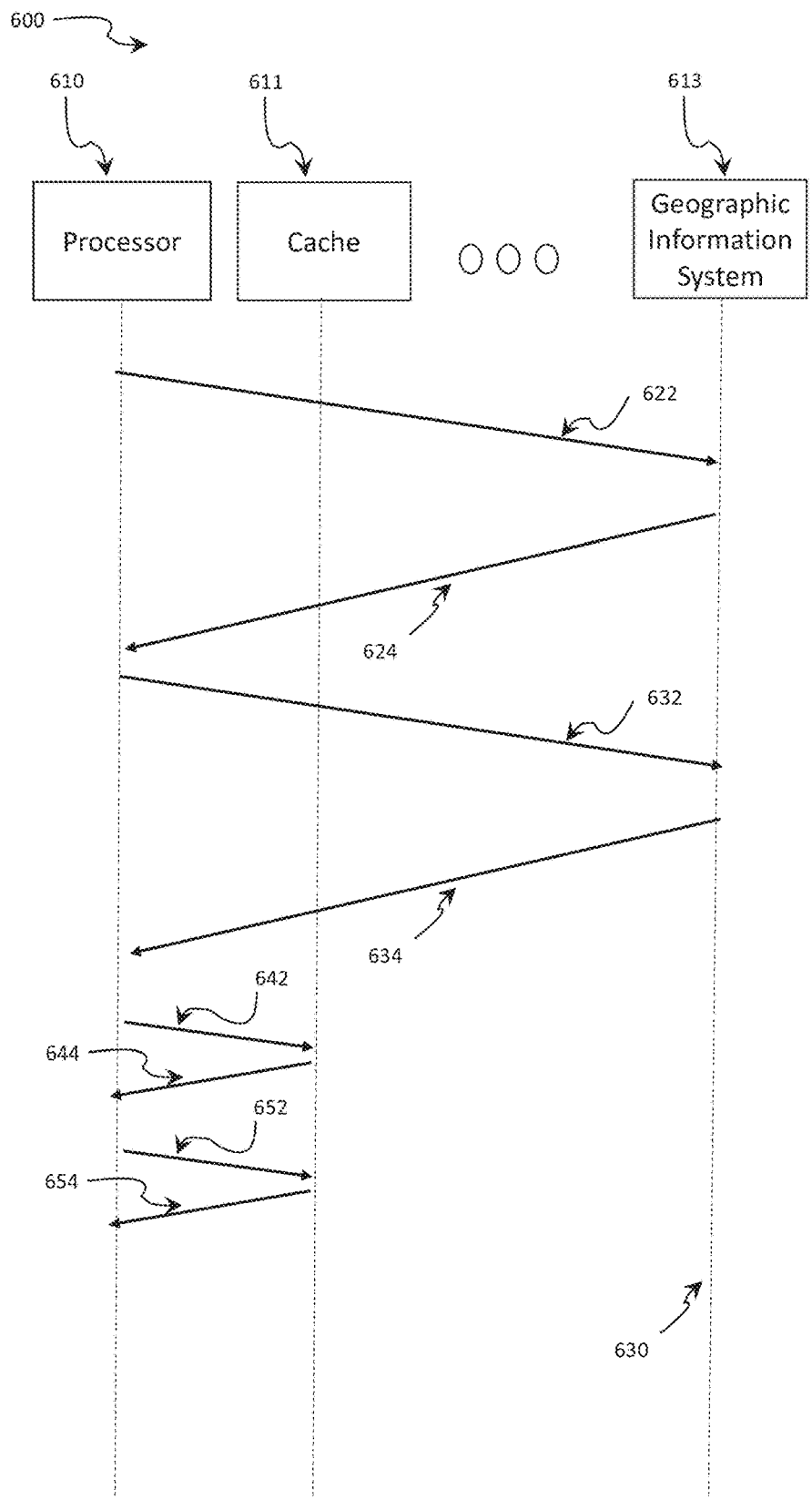
FIG. 6 is another additional sequence diagram of an exemplary process for predicting travel time by using adjacent travel time, according to some alternative embodiments of the present disclosure.

Reference is now made to FIG. 6, which is another additional sequence diagram of an exemplary process for predicting travel time by using adjacent travel time, according to some alternative embodiments of the present disclosure.

The exemplary sequence diagram 600 exemplifies a sequence of inferences associated with a process such as 200 (shown in FIG. 2). Some implementations of a process for predicting travel time by using adjacent travel time, follow a query, comprising a tuple of geographic locations and time, arriving at the input interface 112 (shown in FIG. 1). The processor 610, is connected to a cache 611, which may be similar to 118 in FIG. 1. The system further comprises an interface with a geographic information system 613, such as 140 (shown in FIG. 1). The timeline is depicted for each agent such as the geographic information system as a descending line 630.

The exemplary sequence 600 starts as the processor queries the geographic information system (GIS) for a nominal predictive travel time estimation at 622. The process continues as shown at 624 as the GIS system submits the answer and the processor continues by receiving a nominal predictive travel time estimation.

The processor may, due to some heuristic, or due to following initialization and having an empty cache, may skip checking the cache, and continue by querying the geographic information system (GIS) for a predictive travel time estimation at 632. The process continues as shown at 634 as the GIS system submits the answer and the processor continues by receiving a predictive travel time estimation, and submitting it to the querying system through the output interface 115 shown in FIG. 1.

The processor may generate a corrective factor by applying the predictive travel time estimation on the nominal predictive travel time estimation, for example by dividing the former by the latter. Followingly, the processor may store the corrective factor in the cache at 642 and receive an acknowledgement at 644. The processor may further store additional information about the query in the cache, such as the exact points and the nominal predictive travel time.

The processor may receive another query from the input interface 115 shown in FIG. 1, and continue at 652 with checking if enough information to answer the query, including the nominal predictive travel time estimation and the corrective factor are found in the cache 611. The cache returns the information at 654, allowing the processor to calculate the predictive travel time estimation. The processor may complete the query, by returning the predictive travel time estimation through the output interface 115.

It should be noted that this is another exemplary flow on an exemplary implementation, provided to illustrate an exemplary sequence of communication transactions, and actual flow of events and system behavior may vary.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods for querying and supplying geographic information, smart city systems, and the likes will be developed and the scope of the term GIS is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting. In addition, any priority document(s) of this application is/are hereby incorporated herein by reference in its/their entirety.

What is claimed is:

1. A system for calculating predictive travel time estimations given a tuple of geographic locations and a time, the system comprising:
    at least one memory storing a code, a set comprising geographic locations, each location is assigned to a cluster, a cache storing corrective factors for tuples of clusters;
    a network interface;
    and
    a processor adapted to execute the code for:
        receiving the tuple of a plurality of geographic locations and the time, the geographic locations comprised by the set;
        using the network interface for sending a query via a network to a geographic information system for a nominal predictive travel time estimation, the query includes the tuple of a plurality of geographic locations;
        using the network interface for receiving via the network a response to the query that includes the nominal predictive travel time estimation, from the geographic information system;
        querying the cache for a corrective factor for at least one cluster tuple, wherein the tuple of the plurality of geographic locations is associated with said cluster tuple; and
        calculating a predictive travel time estimation by applying the corrective factor for the at least one cluster tuple on the nominal predictive travel time estimation.

2. The system of claim 1, wherein the cache storing corrective factors for tuples of clusters further storing times, and querying the cache for a corrective factor for at least one cluster tuple further comprising checking when time is compliant.

3. The system of claim 1, wherein each location is assigned to a cluster, determined by a grid division.

4. The system of claim 1, wherein each location is assigned to a cluster, determined by a municipal partition.

5. The system of claim 1, wherein applying the corrective factor from the at least one cluster tuple on the nominal predictive travel time estimation, is done by multiplication.

6. The system of claim 1, further comprising an additional assignment of geographic locations to clusters, and the assignment of associative clusters is determined by comparing the distance between the geographic locations in the tuple to a threshold.

7. The system of claim 6, wherein the additional assignment of geographic locations to clusters is hierarchical, and at least one cluster of one assignment comprises a plurality of clusters of the other assignment.

8. The system of claim 1, further comprising when a corrective factor for at least one cluster tuple is not found in the cache:
    using the network interface for querying the geographic information system for a predictive travel time estimation, by submitting the tuple of a plurality of geographic locations and the time;
    using the network interface for receiving a predictive travel time estimation, from the geographic information system;
    calculating the corrective factor based by applying the predictive travel time estimation on the nominal predictive travel time estimation; and
    storing the corrective factor as a corrective factor for the tuple of the associated clusters.

9. The system of claim 3, further comprising an additional assignment of geographic locations to clusters, determined by a finer grid division.

10. A computer implemented method for calculating predictive travel time estimations given a tuple of geographic locations and a time, using a set comprising geographic locations, wherein each geographic location is assigned to a cluster, a network interface, and cache storing corrective factors for tuples of clusters, the computer implemented method comprising:
    receiving the tuple of a plurality of geographic locations and the time, the geographic locations comprised by the set;
    using the network interface for querying a geographic information system for a nominal predictive travel time estimation, by submitting the tuple of a plurality of geographic locations;
    using the network interface for receiving the nominal predictive travel time estimation, from the geographic information system;

querying the cache for a corrective factor for at least one cluster tuple, wherein the tuple of the plurality of geographic locations is associated with said cluster tuple; and calculating a predictive travel time estimation by applying the corrective factor from the at least one cluster tuple on the nominal predictive travel time estimation.

11. The computer implemented method of claim 10, wherein the cache storing corrective factors for tuples of clusters further storing times, and querying the cache for a corrective factor for at least one cluster tuple further comprising checking when time is compliant.

12. The computer implemented method of claim 10, wherein each location is assigned to a cluster, determined by a grid division.

13. The computer implemented method of claim 10, wherein each location is assigned to a cluster, determined by a municipal partition.

14. The computer implemented method of claim 10, wherein applying the corrective factor from the at least one cluster tuple on the nominal predictive travel time estimation, is done by multiplication.

15. The computer implemented method of claim 10, further comprising an additional assignment of geographic locations to clusters, and the assignment of associative clusters is determined by comparing the distance between the geographic locations in the tuple to a threshold.

16. The computer implemented method of claim 15, wherein the additional assignment of geographic locations to clusters is hierarchical, and at least one cluster of one assignment comprises a plurality of clusters of the other assignment.

17. The computer implemented method of claim 10, further comprising when a corrective factor for at least one cluster tuple is not found in the cache:

using the network interface for querying the geographic information system for a predictive travel time estimation, by submitting the tuple of a plurality of geographic locations and the time;

using the network interface for receiving a predictive travel time estimation, from the geographic information system;

calculating the corrective factor by applying the predictive travel time estimation on the nominal predictive travel time estimation; and storing the corrective factor as a corrective factor for the tuple of the associated clusters.

18. The computer implemented method of claim 10, further comprising an additional assignment of geographic locations to clusters, determined by a finer grid division.

19. A computer program product for calculating predictive travel time estimations given a tuple of geographic locations and a time, using a set comprising geographic locations, wherein each geographic location is assigned to a cluster, and a cache stores corrective factors for tuples of clusters, and a network interface, the computer program product comprising a non-transitory computer readable storage medium having:

first program instructions for receiving the tuple of a plurality of geographic locations and the time, the geographic locations comprised by the set;

second program instructions for using the network interface for querying a geographic information system for a nominal predictive travel time estimation, by submitting the tuple of a plurality of geographic locations;

third program instructions for using the network interface for receiving the nominal predictive travel time estimation, from the geographic information system;

fourth program instructions for querying the cache for a corrective factor for at least one cluster tuple, wherein the tuple of the plurality of geographic locations is associated with said cluster tuple; and fifth program instructions for calculating a predictive travel time estimation by applying the corrective factor from the at least one cluster tuple on the nominal predictive travel time estimation.

\* \* \* \* \*